3,118,876
PROCESS FOR PREPARING GLYCOSIDE
PHOSPHATES
Tyunosin Ukita and Kinzo Nagasawa, Tokyo, Japan, assignors to Takeda Pharmaceutical Industries, Ltd., Higashi-ku, Osaka, Japan
No Drawing. Filed July 24, 1959, Ser. No. 829,222
Claims priority, application Japan July 26, 1958
6 Claims. (Cl. 260—211.3)

This invention relates to a method for preparing phosphates of compounds having two or more hydroxyl groups.

Characteristic of this invention is the use of pyrocatechol cyclic phosphate representable by the formula

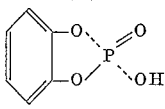

as the agent for making the phosphates.

According to the present invention, a primary carbinol having a non-protected hydroxyl group at the vicinal carbon atom can be substantially quantitatively converted into the monophosphate of the primary carbinol by pyrocatechol cyclic phosphate. Accordingly, such phosphates of a polyvalent alcohol as sugar monophosphates or monophosphates of compounds having a sugar moiety may advantageously be synthesized through the path of the present invention.

The primary object of this invention is the embodiment of a new process for preparing phosphates by the use of pyrocatechol cyclic phosphate, and such object is realized by subjecting pyrocatechol cyclic phosphate to alcoholysis with an alcohol having, vicinally oriented, two or more hydroxyl groups, and hydrolyzing the resultant product.

In the method of this invention, pyrocatechol cyclic phosphate is subjected to alcoholysis with an alcohol having two or more vicinally oriented hydroxyl groups. Such alcohols may be aliphatic, aromatic or heterocyclic or other in character. More particularly, they may be sugars such as glucose, ribose, galactose, mannose, sucrose and gentiobiose of which the terminal glycolic group is unsubstituted, or co-enzymes having a polyol moiety, such as riboflavin.

The alcoholysis of the pyrocatechol cyclic phosphate is usually conducted in an organic solvent suitably chosen, and the reaction can be accelerated by heating. For example, pyridine bases such as pyridine and picoline, aromatic hydrocarbons such as benzene and toluene may be used as the organic solvent.

It is considered that a cyclic phosphate of the alcohol used is first formed through the above-mentioned alcoholysis. The cyclic phosphate appears to be formed with the nearest two hydroxyl groups when the alcohol has three or more hydroxyl groups. The cyclic phosphate of the alcohol is then hydrolyzed to monophosphate of the alcohol.

This hydrolysis is effected by the contact of the cyclic phosphate with water, and is accelerated by the addition of an acid or alkaline substance or by heating. Organic or inorganic acids such as hydrochloric, sulfuric and acetic acids or cation exchanger treated with an acid, or anion exchanger treated with an alkali, for instance, may be used for this purpose.

The phosphate of the alcohol is representable by the formula

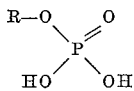

wherein R represents the residue of an alcohol having two or more hydroxyl groups, and the phosphate may be isolated as such or as a salt from the reaction mixture utilizing differences between the phosphate and impurities in physicochemical properties such as solubility, distribution coefficient between two solvents, adsorbability, dialyzability, precipitability, etc.

As is hereinbefore described, a primary carbinol having a non-protected hydroxyl group at a neighboring carbon atom can be converted into the monophosphate in excellent yield by the present invention, which is the most significant characteristic of this invention. In the known methods for preparing the monophosphate of polyvalent alcohols, even the most convenient methods which use diphenyl or dibenzyl-phosphorochloridate require protection of the hydroxyl groups of the polyvalent alcohol which do not participate in the reaction, with proper blocking radicals before the phosphorylation. For example, when D-glucopyranose-6-phosphate is the desired product, D-glucose, of which the hydroxyl radical at the 6-position is protected by trityl radical and the remaining hydroxyl groups are acetylated, is hydrolyzed to 1,2,3,4-tetra-O-acetylglucopyranose, the product is reacted with diphenyl phosphorochloridate to introduce the diphenylphosphoryl group into the hydroxyl group at 6-position, and the phenyl radicals are split off through catalytic reduction to obtain 1,2,3,4-tetra-O-acetylglucopyranose-6-phosphate, and then the acetyl groups are split off to yield D-glucopyranose-6-phosphate. This process is very complicated, whereas in this invention the desired product, D-glucopyranose-6-phosphate, is obtained from D-glucose by only two step reactions.

The following examples are illustrative embodiments of the invention, but they are not intended to limit the scope of this invention. In the examples the temperatures are all uncorrected, the percentages are all in weight percent, and parts by weight bear the same relation to parts by volume as do grams to milliliters.

EXAMPLE 1

*DL-Erythritol-1-phosphate*

A mixture of 1.83 parts by weight of powdery DL-erythritol (dried over phosphorus pentoxide), 1.3 parts by weight of pyrocatechol cyclic phosphate and 50 parts by volume of pyridine is stirred for 3 hours at a temperature of 100–110° C., then the pyridine is distilled off under reduced pressure. To a solution of the syrupy residue in 20 parts by volume of water are added 2 parts by volume of sulfuric acid to make the mixture strongly acid. The mixture is refluxed for one hour, then is neutralized with a saturated aqueous solution of barium hydroxide after cooling. The precipitate is removed, and the filtrate is concentrated under reduced pressure to about 50 parts by volume. The concentrate is again filtered, and 50 parts by volume of 95% ethanol are added to the filtrate to separate a white powdery substance. The product is washed twice with 95% ethanol to obtain 1.37 parts by weight of the crude barium salt of DL-erythritol-1-phosphate.

In 5 parts by volume of water is dissolved 0.6 part by weight of the barium salt. The solution is allowed to flow through a column packed with an ion exchange resin Amberlite IR–120 (H+) (Rohm & Haas Co., U.S.A.). The effluent is adjusted to pH 9–10 with cyclohexylamine, and the solution is concentrated to dryness under reduced pressure. On a water bath, a mixture of the residue and 5 parts by volume of 95% ethanol is warmed. After cooling, the mixture is centrifuged to obtain the white precipitate. The precipitate is recrystallized from 95% ethanol, then is dried over phosphorus pentoxide under a pressure of 3–5 millimeters/Hg at room temperature (20–30°) for 2 hours. The product, di-cyclohexylamine salt of DL-erythritol-1-phosphate, occurs as fine needle-like crystals, and decomposes at 189° C. The yield is 0.41 part by weight.

*Analysis.*—Calcd. for $C_{16}H_{37}O_7N_2P$: C, 48.00%; H, 9.25%; N, 7.00%; P, 7.75%. Found: C, 48.02%; H, 9.24%; N, 7.20%; P, 7.92%.

The cyclohexylamine salt thus obtained may be converted to the free base by the use of an acidic reagent, e.g. an ion exchanger such as Amberlite IR–120 (Rohm & Haas Co., U.S.A.), or a dilute acid such as hydrochloric acid, or in any other appropriate and per se known manner.

EXAMPLE 2

D-Mannitol-1-Phosphate

A mixture of 9.1 parts by weight of powdery D-mannitol (dried over phosphorus pentoxide), 1.72 parts by weight of pyrocatechol cyclic phosphate and 200 parts by volume of pyridine is stirred at a temperature of 100–110° C. 1.72 parts by weight of pyrocatechol cyclic phosphate are further added twice to the mixture 30 minutes and 90 minutes after the start of the reaction. The reaction is maintained for 2.5 hours. Then the pyridine is removed under reduced pressure to make the volume about 50 parts by volume. After being left standing overnight in a refrigerator, the separated unreacted D-mannitol is filtered off and the filtrate is concentrated under reduced pressure to obtain a syrupy residue. To a solution of the residue in 100 parts by volume of water is added a strongly acid ion-exchange resin Amberlite IR–120 (H+) (Rohm & Haas Co., U.S.A.) or another acid reagent such as hydrochloric acid, to make the solution strongly acid, and then the mixture is refluxed for 2 hours.

After cooling the mixture, the solution is neutralized with an aqueous solution of barium hydroxide, and the mixture is stored in a refrigerator overnight. The precipitate formed is removed, and the filtrate is concentrated under reduced pressure to 150 parts by volume. The concentrate is mixed with 95% ethanol and left standing overnight, and the separated matter, crude barium salt of D-mannitol-1-phosphate, is collected by filtration. The yield is 7.15 parts by weight.

To a saturated aqueous solution of ammonium carbonate are added 2.5 parts by weight of the above barium salt, and the barium carbonate formed is removed by filtration. The filtrate contains the ammonium salt of D-mannitol-1-phosphate. The filtrate is concentrated under reduced pressure to 5 parts by volume. The concentrate is poured on the top of a column (2.7 centimeters x 30 centimeters) packed with cellulose powder which is treated with a mixture of isopropanol, water and concentrated aqueous ammonia (7:2:1) in advance. The column is developed with a mixture having the same components as above, and each fraction of the effluent is subjected to paper chromatography. The fraction which gives only a spot of D-mannitol-1-phosphate is collected. The fraction is concentrated under reduced pressure, and the insoluble matter is removed by filtration. The filtrate is allowed to flow through a column packed with ion exchange resin Amberlite IR–120 (H+) (Rohm & Haas Co., U.S.A.). To the effluent is added cyclohexylamine to adjust to pH 9–10, then is concentrated under reduced pressure. To the syrupy residue, 95% ethanol is added dropwise to separate crystals. After recrystallization from 95% ethanol, the product, di-cyclohexylamine salt of D-mannitol-1-phosphate, M.P. 195° C. (decomp.), is dried over phosphorus pentoxide at room temperature for 5 hours under a pressure of 3–5 millimeters/Hg. The yield is 1.83 parts by weight.

*Analysis.*—Calcd. for $C_{18}H_{40}O_9N_2P$: C, 46.95%; H, 8.98%; N, 6.09%; P, 6.74%. Found: C, 46.35%; H, 9.14%; N, 6.00%; P, 6.70%.

The product is identified by the method of periodic acid titration. And the product may be converted to free D-mannitol-1-phosphate in per se conventional manner, e.g. by treatment with an acidic reagent such as dilute HCl.

EXAMPLE 3

D-Glucopyranose-6-Phosphate

To a solution of 1 part by weight of 1,2-O-isopropylideneglucofuranose in 20 parts by volume of anhydrous pyridine are added 1.3 parts by weight of pyrocatechol cyclic phosphate, and the mixture is stirred for 2 hours at 85–95° C. The pyridine is distilled off under reduced pressure to obtain a syrupy residue. The residue is dissolved in 15 parts by volume of water and the solution is decationized with Amberlite IR–120 (H+) (Rohm and Haas Co., U.S.A.). The acidic solution (about 0.5 mol) is warmed at 95° C. for 5 hours and neutralized with saturated barium hydroxide solution. The barium phosphate precipitated is removed by centrifugation and the supernatant liquid is concentrated to separate barium glucopyranose-6-phosphate which is isolated by filtration as white prisms containing water of crystallization.

These crystals are suspended in 15 parts by volume of distilled water, and the cation is removed by means of ion exchange resin Amberlite IR–120 (H+) (Rohm & Haas Co., U.S.A.), and the solution is decolorized with a small quantity of activated charcoal, then the pH of the solution is adjusted to 6.2 with N-NaOH solution. An amount of barium acetate equivalent to the solution is added, and the mixture is allowed to stand at room temperature overnight. The precipitated matter is separated by centrifugation. To the supernatant is added four times its volume of anhydrous ethanol, and the mixture is allowed to stand to separate the formed white precipitate. The centrifuged precipitate is washed with 80% ethanol and ether, successively, to obtain 1.32 parts by weight of the barium salt of D-glucopyranose-6-phosphate as white amorphous powder.

*Analysis.*—Calcd. for $C_6H_{11}O_5PO_4Ba$: C, 18.22%; H, 2.81%; P, 7.84%. Found: C, 18.48%; H, 3.86%; P, 7.60%.

The product is identified with D-glucopyranose-6-phosphate obtained through a known method by paper chromatograpy. Further, the identification is effected by periodic acid titration. The product may be converted into the free phosphate in per se conventional manner.

EXAMPLE 4

Riboflavin-5′-Monophosphate

A mixture of 5 parts by weight of riboflavin, 6.5 parts by weight of catechol cyclic phosphate and 2000 parts by volume of anhydrous pyridine is stirred at 130–140° C. for a while. To the mixture, 5 parts by weight of pyrocatechol cyclic phosphate are added 30 minutes after the start of the reaction. After 2 hours from the start of the reaction, the mixture is concentrated to dryness under reduced pressure. A small quantity of ion exchange resin Amberlite IR–120 (H+) (Rohm & Haas Co., U.S.A.) is added to a solution of the residue in 150 parts by volume of water. After being kept standing for a while, the ion exchange resin is removed by filtration and washed with distilled water. The filtrate is combined with the washings, and the strongly acid solution (about 200 parts by volume) is heated for 15 minutes at a temperature of 95° C. The presence of riboflavin-5′-monophosphate in the reaction mixture is confirmed by both paper partition chromatography and electrophoresis.

The above reaction mixture containing riboflavin-5′-monophosphate may be contaminated with a small quantity of riboflavin-4′,5′-diphosphate, and other impurities may be contained. The purification of such crude riboflavin-5′-monophosphate-containing matter may be conducted by recrystallization as such or as a suitable salt thereof, for instance. However, purification by recrystallization is rather difficult and the yield is not always satisfactory, because the object compound and the impurities have similar physical properties including solubility.

A further object of this invention is to embody a new and advantageous process for purifying crude riboflavin-5'-monophosphate. This object is realized by subjecting crude riboflavin-5'-monophosphate to electrophoresis. That is, according to the present invention, riboflavin-5'-monophosphate is isolated and purified utilizing the difference between riboflavin-5'-monophosphate and impurities in migration distance in electrophoresis. The electrophoresis may be conducted in the mode of paper electrophoresis, a process using gel or powder as carrier, moving surface method, diaphragm method and electrophoresis convection. The conditions such as buffer solution to be employed, carrier, voltage, electric current and temperature, are correlated to the type of electrophoresis method employed.

The most suitable process of the electrophoresise for purifying riboflavin-5'-monophosphate is the zone-electrophoresis process using cellulose powder as the carrier. A buffer solution showing about pH 6–9 is suitable for the purpose. The buffer solution may contain water or a lower aliphatic alcohol and an organic or inorganic acid or base and a water-soluble organic or inorganic salt.

Carrier on which the solution is hung is prepared by kneading cellulose powder with the buffer solution and then plasticized. The size of the plasticized carrier is adjusted in accordance with the conditions such as the kind and quantity of the riboflavin-5'-monophosphate-containing material. Voltage, currency, temperature, electrophoresis period and other conditions are selected so as to purify the material most effectively.

The electrophoresis is conducted, for instance, as is described in the following example.

EXAMPLE 5

*Purification of Riboflavin-5'-Monophosphate*

Onto 4 sheets of filter paper (6 centimeters x 1.5 centimeters x 1 millimeter) is absorbed 2 cubic centimeters of the product of Example 4. 120 grams of cellulose powder of 100–200 mesh are kneaded with 1000 cubic centimeters of a solvent (pH 6) composed of n-butanol, acetic acid, pyridine (20 cubic centimeters:2 cubic centimeters:10 cubic centimeters) and water. The kneaded matter is packed into an electrophoresis instrument made from plastic (6 centimeters x 33 centimeters x 1.5 centimeters). The above pieces of filter paper are inserted into a place 4 centimeters distant from the anode. The electrophoresis is conducted by the use of the above buffer mixture under 200 volts and 3–10 milliamperes at room temperature for 15 hours. The second yellow zone from the starting line is eluted with distilled water until the zone loses the yellow fluorescence completely. The eluate is concentrated under reduced pressure to about 10 cubic centimeters, then the precipitated matter is filtered off. The concentrate is further evaporated to dryness to obtain 56.5 milligrams of almost pure riboflavin-5'-monophosphate. The product is confirmed to be contaminated by a small quantity of riboflavin-4',5'-diphosphate by means of paper chromatography as well as paper electrophoresis.

A portion of 85 milligrams of the product is dissolved in 1 N-HCl by warming for about 2 minutes on a water bath. The insoluble matter is removed by centrifugation while the solution is hot, then the filtrate is allowed to stand overnight in a refrigerator.

The fine yellow crystals separated are washed with 0.5 cubic centimeter portions each of cold 50% and anhydrous ethanols, successively. The product is dried over phosphorus pentoxide at room temperature under a pressure of 3–5 millimeters/Hg for 5 hours to obtain 40 milligrams of riboflavin-5'-monophosphate.

*Analysis.* — Calcd. for $C_{17}H_{21}O_9N_4P \cdot \frac{1}{2}H_2O$: C, 43.84%; H, 4.76%; N, 12.01%; P, 6.66%. Found: C, 43.90%; H, 5.14%; N, 11.82%; P, 6.99%.

The product is identified with an authentic specimen of riboflavin-5'-monophosphate obtained by another method by means of paper chromatography or paper electrophoresis or periodic acid titration.

The hereinbefore-employed cation exchange resin Amberlite IR–120 is styrene-divinylbenzene copolymer containing nuclear sulfonic acid groups which may be prepared for example as described on pages 20–22 of Ion Exchanger in Organic and Biochemistry, Calmon and Kressman, Intescience Publishers, New York, 1957. That is, a mixture of monomeric styrene and divinylbenzene is polymerized under the presence of benzoyl peroxide as a polymerization accelerator at about 100° C. with stirring to obtain the bead-form copolymer, then the copolymer is sulfonated with concentrated sulfuric acid.

What is claimed is:

1. A process for preparing DL-erythritol-1-phosphate, which comprises reacting DL-erythritol with pyrocatechol cyclic phosphate, hydrolyzing the resulting compound, and isolating the desired phosphate.

2. A process for preparing D-mannitol-1-phosphate, which comprises reacting D-mannitol with pyrocatechol cyclic phosphate, hydrolyzing the resulting compound, and isolating the desired phosphate.

3. A process for preparing D-glucopyranose-6-phosphate, which comprises reacting 1,2-O-isopropylideneglucofuranose with pyrocatechol cyclic phosphate, hydrolyzing the resulting compound, and isolating the desired phosphate.

4. A process for preducing riboflavin-5-monophosphate, which comprises reacting riboflavin with pyrocatechol cyclic phosphate, hydrolyzing the resulting compound, and isolating the desired phosphate.

5. A process for the preparation of a phosphate of a primary carbinol having a free glycolic hydroxyl group at the carbon atom vicinal to the carbinol carbon atom, which comprises reacting the said carbinol with pyrocatechol cyclic phosphate, hydrolyzing the resulting compound, and isolating the desired phosphate.

6. A process for the preparation of a phosphate of sugar alcohol having a free glycolic hydroxyl group at the carbon atom vicinal to the carbinol carbon atom, which comprises reacting the said sugar alcohol with pyrocatechol cyclic phosphate, hydrolyzing the resulting compound, and isolating the desired phosphate.

References Cited in the file of this patent

UNITED STATES PATENTS

| | | |
|---|---|---|
| 2,827,428 | Noble | Mar. 18, 1958 |
| 2,843,540 | Ressler | July 15, 1958 |
| 2,900,408 | Blaser et al. | Aug. 18, 1959 |
| 2,903,476 | Kahler | Sept. 8, 1959 |

OTHER REFERENCES

McDonald: Ionography, 1956, pages 170–171.
Ukita: Jr. Am. Chem. Soc. 80 (1958), pages 1373–6.